(12) United States Patent
Lee et al.

(10) Patent No.: US 8,994,694 B2
(45) Date of Patent: Mar. 31, 2015

(54) OPTICAL INTERFERENCE BASED USER INPUT DEVICE

(75) Inventors: Hsin Chin Lee, Waterloo (CA); Antanas Matthew Broga, Cambridge (CA); ZhongMing Ma, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 550 days.

(21) Appl. No.: 13/307,671

(22) Filed: Nov. 30, 2011

(65) Prior Publication Data

US 2013/0135254 A1    May 30, 2013

(51) Int. Cl.
 *G06F 3/042* (2006.01)
 *G06F 3/03* (2006.01)
 *G06F 3/041* (2006.01)

(52) U.S. Cl.
 CPC ............ *G06F 3/0317* (2013.01); *G06F 3/0414* (2013.01); *G06F 3/0421* (2013.01); *G06F 2203/04105* (2013.01); *G06F 2203/04106* (2013.01)
 USPC ........................................................ 345/175

(58) Field of Classification Search
 CPC ...................................................... G06F 3/042
 USPC ........................................................ 345/175
 See application file for complete search history.

(56) References Cited

U.S. PATENT DOCUMENTS

| | | | |
|---|---|---|---|
| 6,445,426 B1 | 9/2002 | Kang et al. | |
| 6,567,068 B2 | 5/2003 | Rekimoto | |
| 6,690,358 B2 | 2/2004 | Kaplan | |
| 7,038,662 B2 | 5/2006 | Noguera | |
| 7,365,734 B2 | 4/2008 | Fateh et al. | |
| 7,460,110 B2 * | 12/2008 | Ung et al. ...................... | 345/173 |
| 2005/0243062 A1 | 11/2005 | Liberty | |
| 2006/0109222 A1 * | 5/2006 | Lee et al. ......................... | 345/88 |
| 2008/0143675 A1 | 6/2008 | Hsieh et al. | |
| 2009/0262074 A1 | 10/2009 | Nasiri et al. | |
| 2009/0267918 A1 | 10/2009 | Lu et al. | |
| 2009/0315989 A1 | 12/2009 | Adelson | |
| 2010/0103140 A1 * | 4/2010 | Hansson ....................... | 345/175 |
| 2010/0117960 A1 | 5/2010 | Huntzicker et al. | |
| 2010/0171691 A1 | 7/2010 | Cook et al. | |
| 2010/0321342 A1 * | 12/2010 | Lee ................................ | 345/175 |

FOREIGN PATENT DOCUMENTS

| | | |
|---|---|---|
| EP | 1321753 | 6/2003 |
| EP | 12244171 | 10/2010 |

OTHER PUBLICATIONS

EESR dated Apr. 5, 2012 for European Patent Application No. 11191413.1.

* cited by examiner

*Primary Examiner* — Quan-Zhen Wang
*Assistant Examiner* — David Lee
(74) *Attorney, Agent, or Firm* — Jeffrey N. Giunta; Fleit Gibbons Gutman Bongini & Bianco P.L.

(57) ABSTRACT

A user input device for an electronic device includes an illumination source and image sensor module. A translucent layer is disposed above the illumination source and the image sensor module. The translucent layer includes at least a first set of patterns disposed thereon. A deformable layer is disposed above the translucent layer. The deformable layer includes at least a second set of patterns. The illumination source is configured to illuminate at least the portion of the translucent layer. The image sensor module includes a field of view that corresponds to at least a portion of the translucent layer. The image sensor module being configured to detect a third set of patterns when the first set of patterns and the second set of patterns are displaced with respect to each other.

18 Claims, 11 Drawing Sheets

OPTICAL INTERFERENCE BASED USER INPUT DEVICE

FIELD OF THE DISCLOSURE

The present disclosure generally relates to user interfaces for electronic devices and more particularly to user input interfaces.

BACKGROUND

Portable or handheld electronic devices including cellular phones and the like comprise user interface input devices that allow a user to interact with items presented on a display. Examples of user interface input devices include arrow keys, trackballs, trackpads, and more recently, optical navigation modules (ONMs) that detect finger movement. ONMs generally sense a gesture performed upon the module by a user's finger. In conventional ONMs, light is directed to a light transmitting surface upon which an object, such as one or more fingers, are moved. The finger reflects light to a sensor beneath the surface, which transmits information to a processor corresponding to light reflected from the moving finger. The processor interprets the movement of patterns of transmitted data in order to determine the corresponding movement of the finger. In this manner, gestures may be communicated from the user to a processor of the computing device.

However, the performance and effectiveness of conventional ONMs can become hindered as a result of their reliance on specular reflection since environmental factors can affect a conventional ONM's ability to properly detect light reflections.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Operating Environment

Figure 1:
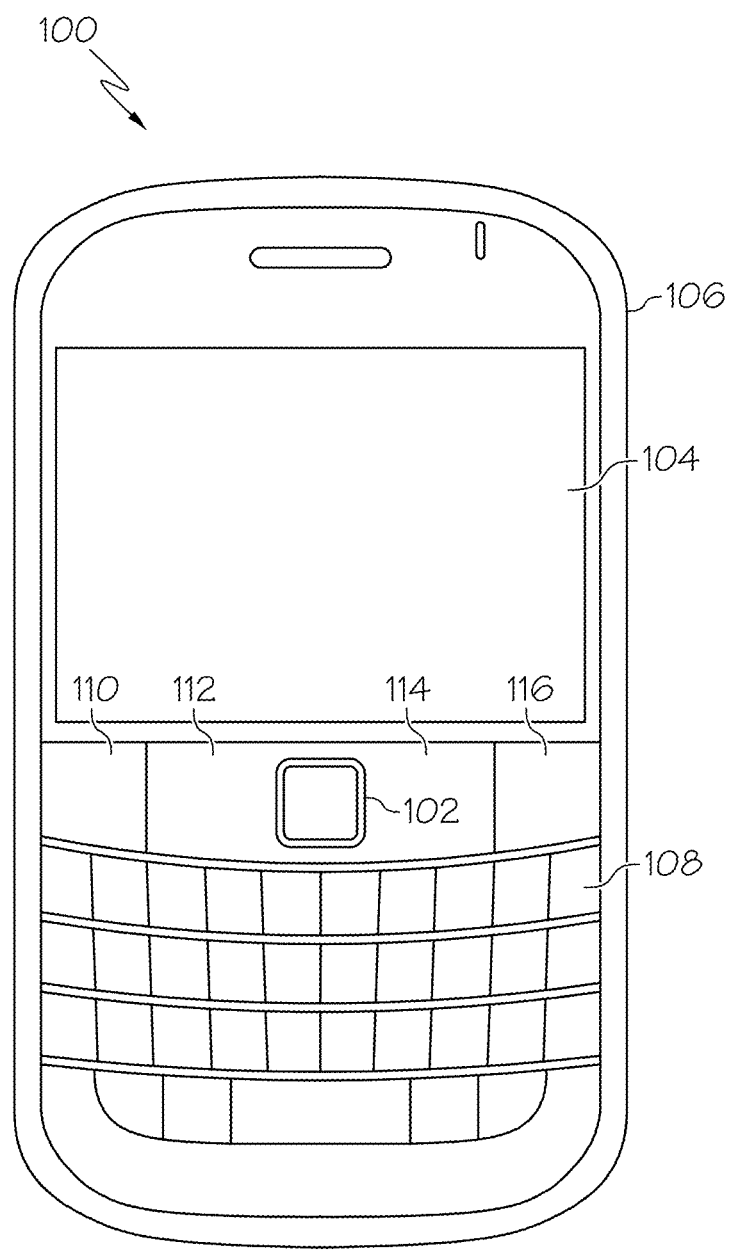
FIG. 1 illustrates a portable electronic device with an optical interference based user input device in accordance with one example.

FIG. 1 illustrates a portable electronic device 100 with an optical interference based user input device 102 in accordance with one example. The portable electronic device 100 in this example is a portable smartphone that supports cellular voice communications and also data communications with a central network. In one example, the electronic device 100 performs data communications with a wireless network to support accessing and exchanging data over the Internet. Data received by the electronic device is displayed on a display 104 (also referred to herein as a "user interface display 104"), which is able to be an alpha-numeric only display or a graphical display, and may or may not have touchscreen capabilities. In one example, the display 104 presents a graphical user interface for a user to access functions and to receive information.

The electronic device 100 is housed within a device case 106. The display 104 is presented on one side of the device case 106. An alpha-numeric keyboard 108 is also physically presented on the same side of the device case 106 as the display 104. In various examples, the alpha-numeric keyboard 108 is able to be a QWERTY keyboard, a numeric telephone keypad, a virtual or "soft" keyboard implemented by key images rendered on a touchscreen display, or any suitable user input device.

The electronic device 100 further includes a number of function keys. The illustrated electronic device 100 has a first function key 110, a second function key 112, a third function key 114, and a fourth function key 116. These function keys are able to be associated with a dedicated function, such as presenting an interface to initiate a voice call whenever pressed, or the function key is able to be associated with different functions based upon a current operating mode of the electronic device 100.

The electronic device 100 further has an optical interference based user input device 102 (also referred herein to as "input device 102"). The design and operation of the input device 102 is discussed in further detail below. The input device 102 of one example is a finger/object movement sensing device on which a user performs a gesture and/or presses with a finger. The input device 102 identifies/tracks the gesture and/or determines a location of a user's finger on the input device 102.

As used herein, the term press (and its derivatives) indicates any touching of a touch surface 304 (FIG. 3) of the input device 102 with an amount of pressure in a direction substantially normal to the touch surface 232 and sufficient to differentiate a gesture of moving an object in contact with and across the touch surface 304 in a given substantially horizontal plane. The term press is contrasted with a gesture of pushing, for example in a direction generally or substantially not parallel to a surface of touch surface 304. Accordingly, a press does not require a corresponding movement of the touch surface, but merely the detection by input device 102 of such general or substantially non-parallel pressure that may be differentiated or distinguished from a generally coplanar or parallel movement across a surface of the touch surface 304.

In one example, with respect to finger movement navigation, the input device 102 detects a sliding, dragging, pushing, or pulling movement of a user's finger or stylus (or similar object) across the touch surface 304. The input device 102 distinguishes a gestural movement from a pressing action based on the amount of pressure applied during the gesture and/or the specific movement involved during the gesture. Based upon a starting position and ending position of the gestural movement (and optionally any intermediate positions) a user input direction is determined. In one operating mode of the electronic device 100, processing determines a direction to move a user interface element based upon the attributes/characteristics of the detected gestural movement, and optionally determines a magnitude, such as distance to move the element or speed with which to move the element, based upon a velocity, acceleration, and/or deceleration of the user's finger or stylus during the gestural movement.

In another example, the input device 102 can accept movement in various directions by the user's finger or a stylus. For example, the user is able to push or pull along the touch surface 304 (or sensor cover 302 (FIG. 3)) in multiple directions along the X/Y plane. The user is also able to tilt the input touch surface 304 in various directions along its center axis. The degree of tilt, in one example, can be varied by the user. In either example, the user is also able to press the touch surface 304 as the input device is being moved/tilted, hold the touch surface 304 at a tilted or a pushed/pulled position, and vary the degree of pressure. The touch surface 304 determines the direction (and optionally degree) of movement or tilt as well as a magnitude of pressure exerted by the user onto the touch surface 304. Based upon the direction (and optionally degree) of movement and amount of pressure that has been determined, a user input direction and magnitude is determined. In one operating mode of the electronic device 100, processing determines a direction to move a user interface element based upon the detected movement, and determines a magnitude, such as distance to move the element or speed with which to move the element, based upon the pressure (and optionally the degree of movement as well).

Conventional Optical Sensors

Figure 2:
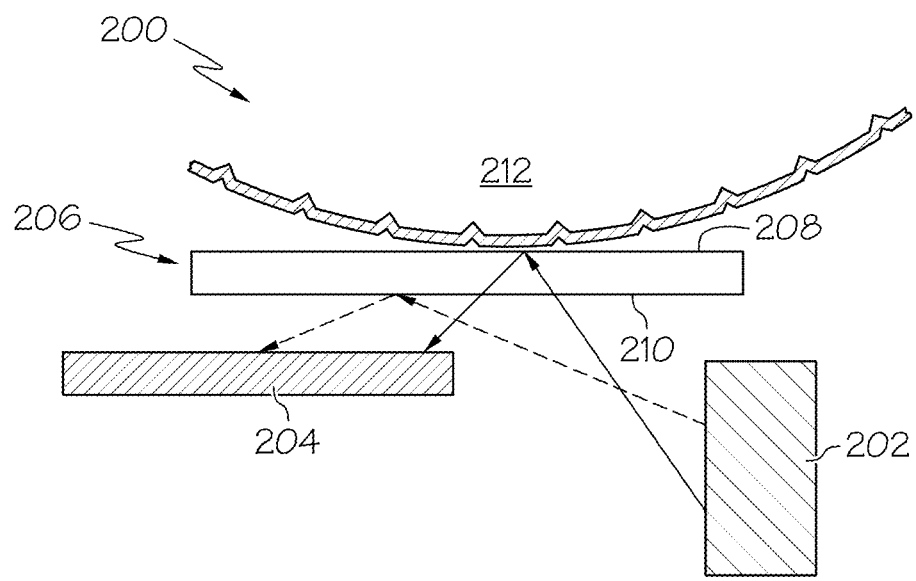
FIG. 2 illustrates a conventional optical sensor for a conventional user input device.

FIG. 2 illustrates a conventional a prior art optical sensor 200 utilized by conventional user input devices. The prior art optical sensor 200 includes a light emitter 202 and a light sensor 204. A touch surface 206 is positioned proximate to the emitter 202 and the sensor 204, and defines a thickness between an upper surface 208 and a lower surface 210. In a typical use of the sensor 200, a fingertip or other object 212 controlled by a user moves upon the touch surface 206 and causes a reflection of light emitted by the emitter 202 to be sensed by the sensor 204. A controller and/or microprocessor analyzes a signal provided by the sensor 204 and determines a location of the object 212 upon the touch surface 206 as a function of time. This analysis is interpreted by the processor to interpret gestures of the user in a context of software executing upon the controller and/or microprocessor. The touch surface 206 is formed of a material which is at least partially transparent to light waves emitted by the emitter 202, whereby light emitted may reflect from the object 212 positioned upon the touch surface 206 to be received at the sensor 204 positioned below the touch surface 304.

The term specular reflection is used to mean the mirror-like reflection of light from a surface, in which light from a single incoming direction (a ray) is reflected into a single outgoing direction. The direction of incoming light (the incident ray), and the direction of outgoing light reflected (the reflected ray) make the same angle with respect to the surface normal, thus the angle of incidence equals the angle of reflection and that the incident, normal, and reflected directions are coplanar.

The reliance of specular reflection from the object 212 to detect movement of the object 212 upon the touch surface 304 results in various short comings. For example, ambient lighting, such as sun light, can affect these conventional optical systems and hinder their performance. Also, residue, such as water, oil, lotion, etc., on the object or the touch surface can also adversely affect the performance of conventional optical sensors as well. Even further, items, such as gloves, can result in these conventional optical sensors performing poorly as well. Additionally, because light is required to pass through the touch surface, the sensor cover of conventional optical sensors is limited to translucent materials and to a limited amount of colors.

Optical Interference Based User Input Device

As will be discussed in greater detail below, various examples of the present invention overcome these and other problems of conventional optical sensors by providing an optical interference based user input device. In one or more examples, the optical interference based user input device comprises a sensor, such as an image sensor, that utilizes one or more patterns that generate a set of interference patterns such as, but not limited to, moiré patterns, when the one or more patterns are displaced with respect to each other.

For example, as the user interacts with the touch surface of the input device, the touch surface (or sensor cover) is deformed and/or displaced. The sensor detects and any changes in the existing interference patterns and/or the creation of any interference patterns created as a result of this deformation/displacement. A controller and/or processor coupled to the sensor is then able to determine a user desired action, such as a selection and/or a movement, based on the detected interference pattern or sequence of interference patterns. Therefore, because the sensor of one or more examples of the present invention utilizes interference patterns instead of detecting light reflections, the sensor is not adversely affected by ambient light and residue. Also, the touch surface and/or sensor cover can be made of a variety of materials and colors and is no longer limited to being transparent.

Figure 3:
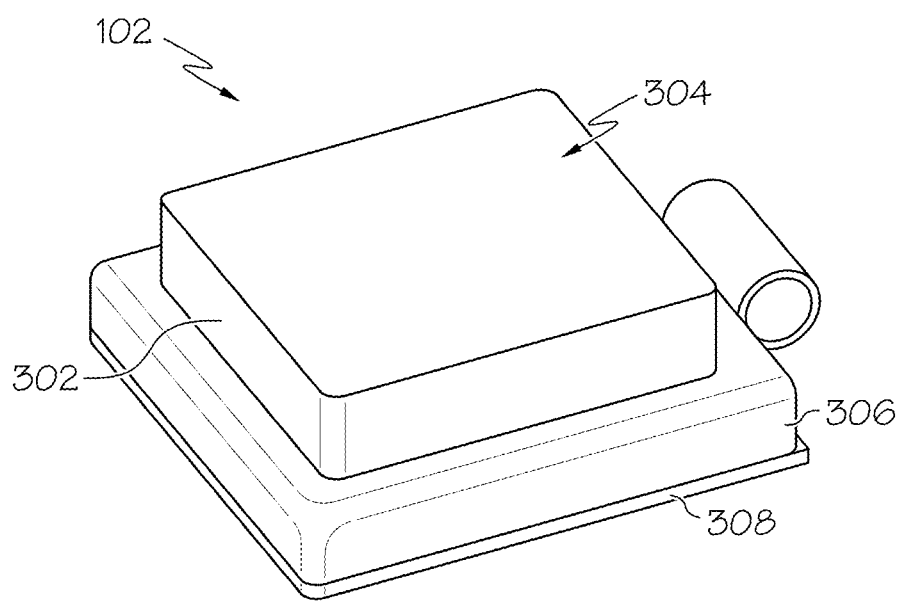
FIG. 3 is a top-side perspective view of the optical interference based user input device of FIG. 1, in accordance with one example.

The input device 102 is now discussed in more detail in accordance with one or more examples of the present invention. FIG. 3 shows a top-side view of the input device 102. The input device 102, in one example, comprises a sensor cover 302. The sensor cover 302, in this example, comprises a top portion 304 (also referred to herein as "touch surface 304") with which a user interacts. For example, the user can place his/her finger(s) (or any other object) on the touch surface 304 and perform one or more gestures thereon. In other words, the sensor cover is not moved when indicating a desired movement. In another example, the user is able to move the sensor cover 302 to indicate a desired movement. For example, the user is able to move, tilt, and/or depress the sensor cover 302 to indicate a desired movement. The input device 102 further comprises an optional retaining member 306 that surrounds the sensor cover 302 and retains the sensor cover 302 over a sensor 401 (FIG. 4), that is capable of sensing finger motion such as, but not limited to an optical sensor. FIG. 2 also shows a circuit board 308 that includes connections which send and receive signals to and from the sensor 401.

Figure 4:
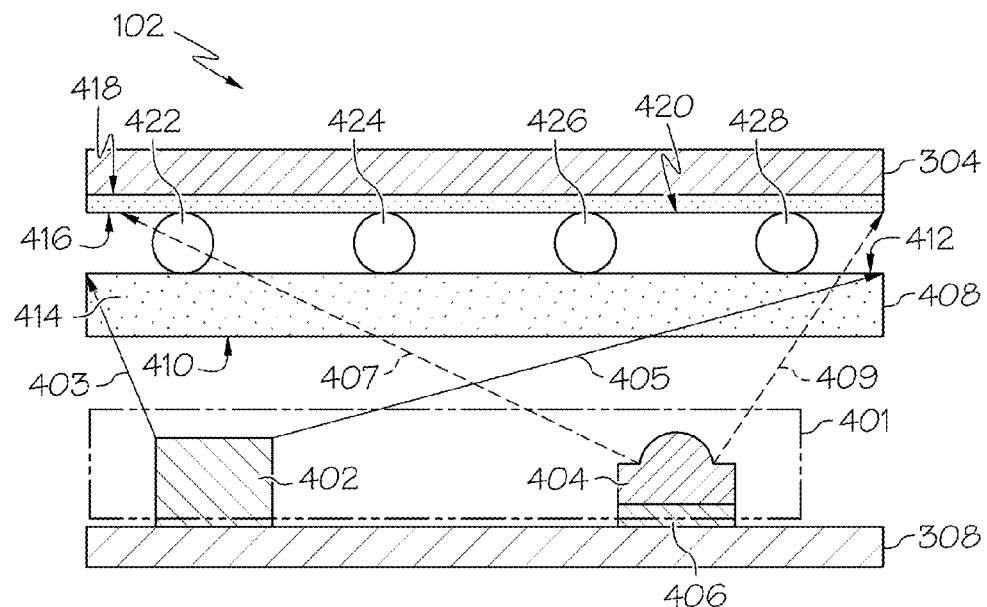
FIGS. 4-5 are cross-sectional views of the optical interference based user input device of FIG. 3, in accordance with one example.

FIG. 4 shows a cross-sectional view of the input device 102. It should be noted that only the touch surface 304 of the sensor cover 302 is shown in FIG. 4 for simplicity. In particular, FIG. 4 shows a sensor module 401 comprising a light emitter 402 (which can include an optional emitter lens (not shown)), an optional receiver lens 404, and an interference pattern detecting module (IPDM) 406 such as, but not limited to, an image sensor. In one example, the light emitter 402 is an infrared light, a light emitting diode, or any other component that emits any type of light. Also, the receiver lens 404, in one example, is disposed above the IPDM 406 and focuses images onto the IPDM 406. In the example shown in FIG. 4, the light emitter 402 and the IPDM 406 are coupled to one or more circuit board 308, which includes connections (not shown) that send and receive signals to and from the sensor 401. The circuit board 308 is coupled to a controller 1302 and/or microprocessor 1416. (See FIGS. 13 and 14).

FIG. 4 also shows that one or more translucent layers or films 408 are disposed above the sensor 401. In one example, this translucent layer 408 comprises a translucent material, such as (but not limited to) plastic film, glass film, etc., that allows light emitted from the emitter 402 to pass through a bottom surface 410 of the translucent layer 408 up through a top surface 412 of the translucent layer 408. In one example, this translucent layer 408 comprises at least a first set of patterns 414 disposed thereon. For example, a non-reflective material, such as (but not limited to) ink, paint, etc., can be disposed on or within the translucent layer 408 in a given pattern(s) such that sensor 401 detects a given image associated with the first set of patterns 414 when the input device 102 is in a first state (e.g., not being interacted with by the user). It should be noted that other methods of creating/disposing the first set of patterns 414 on the translucent layer 408 are applicable as well.

FIG. 4 further shows that the touch surface 304 is disposed above the top surface 412 of the translucent layer 408. In particular, a bottom surface 416 of the touch surface 304 faces the top surface 412 of the translucent layer 408. In one example, at least a portion 418 of the bottom surface 416 of the touch surface 304 is either reflective and/or comprises at least a second set of patterns 420. For example, FIG. 4 shows that this portion 418 comprises a second set of patterns 420 that is either a reflection of the first set of patterns 414 on the translucent layer 408 and/or is a separate pattern(s) disposed on the bottom surface 416 of the touch surface 304. In an example where the second set of patters 420 are a reflection of the first set of patterns 414, the second set of patterns can be reflected through the translucent layer 408 and detected by the IPDM 406.

It should be noted that in the example where the second set of patterns 420 are disposed on the bottom surface 416, the second set of patterns 420 can either be different from or substantially similar to the first set of patterns 414. Alternatively, the light emitted by the emitter 402 can project the first set of patterns 414 onto the bottom surface 416 of the touch surface 304. In one example, the first and second set of patterns 414, 420 are configured such that when one set of patterns is displaced with respect to the second set of patterns, one or more interference patterns such as, but not limited to, a moiré pattern is created. In one example, the IPDM 406 detects this third set of patterns as changes in the first set of patterns 414. These interference patterns are discussed in greater detail below.

In one example, the light emitter 402 is configured to illuminate at least a portion of the translucent layer 408 and at least a portion of the bottom surface 416 of the touch surface 304, as indicated by the solid arrows 403, 405. The IPDM 406, in one example, is also configured to capture an image corresponding to at least a portion of the translucent layer 408 and/or at least a portion of the bottom surface 416 touch surface 304. In other words, at least a portion of the translucent layer 408 and/or at least a portion of the bottom surface 416 of touch surface 304 are within a field of view of the IPDM 406, as indicated by the dashed arrows 407, 409.

Figure 5:
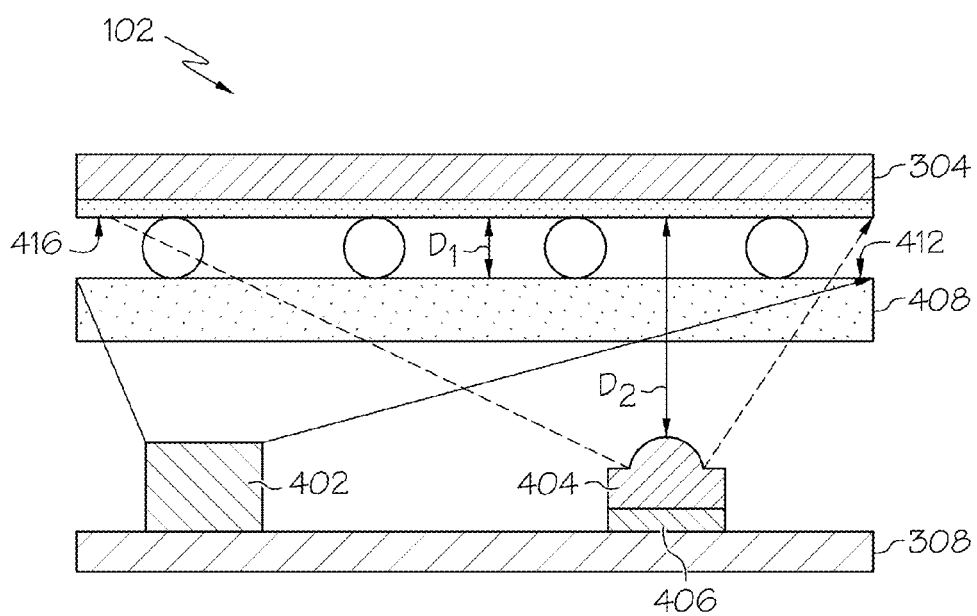

FIG. 4 also shows that a set of resilient spacers 422, 424, 426, 428 are disposed between and abut the bottom surface 416 of the touch surface 304 and the top surface 412 of the translucent layer 408. These spacers 422, 424, 426, 428 define a first distance, D1, between the bottom surface 416 of the touch surface 304 and the top surface 412 of the translucent layer 408 when in a relaxed state, i.e., when the spacers are not being compressed by a force applied to the touch surface 304, as shown in FIG. 5. The spacers 422, 424, 426, 428 also define a first distance, D2, between the bottom surface 416 of the touch surface 304 and the detector module 406 (including the optional receiver lens 404) when in a relaxed state, as shown in FIG. 5. The resilient spacers 422, 424, 426, 428 can comprise any type of resilient material and can be configured in various shapes and sizes.

Figure 6:
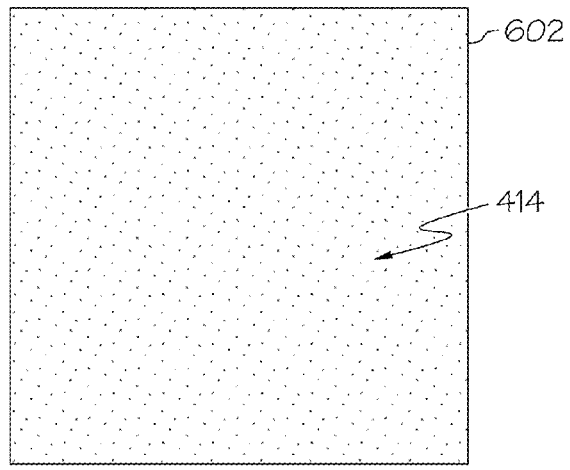
FIG. 6 illustrates an image captured by the image sensor of the optical interference based user input device of FIG. 2, in accordance with one example.

In one example, the emitter 402 illuminates the first set of patterns 414 disposed on the translucent layer 408 and the second set of patterns 420 disposed on the bottom surface 416 of the touch surface 304. This illumination allows the IPDM 406 to detect and capture an image comprising at least the first set of patterns 414. In one example, the first and second patterns 414, 420 are situated with respect to each other such that when the touch surface 304 is in a relaxed state (i.e., not being interacted with), an interference pattern is not detected by the IPDM 406. For example, FIG. 6 shows one example of an image 602, which corresponds to the touch surface 304, captured by the IPDM 406 when the touch surface 304 is in a relaxed state, e.g., the distance between the bottom surface 416 of the touch surface 304 and the top surface 412 of the translucent layer 408 is at a first distance D1. In the example of FIG. 6, the IPDM 406 captures/receives an image 602 comprising only the pattern of the first set of patterns 414 since the first and second set of patterns 414, 420 have not been displaced with respect to each other. However, it should be noted that other configurations are applicable such that when the touch surface 304 is in a relaxed state the image 602 captured by the IPDM 406 comprises at least a portion of the first and second set of patterns 414, 420. In the example of FIG. 6, the controller/microprocessor 1302, 1416 determines that the touch surface 304 is currently not being interacted with based on the image 602 captured/received by the IPDM 406.

Figure 7:
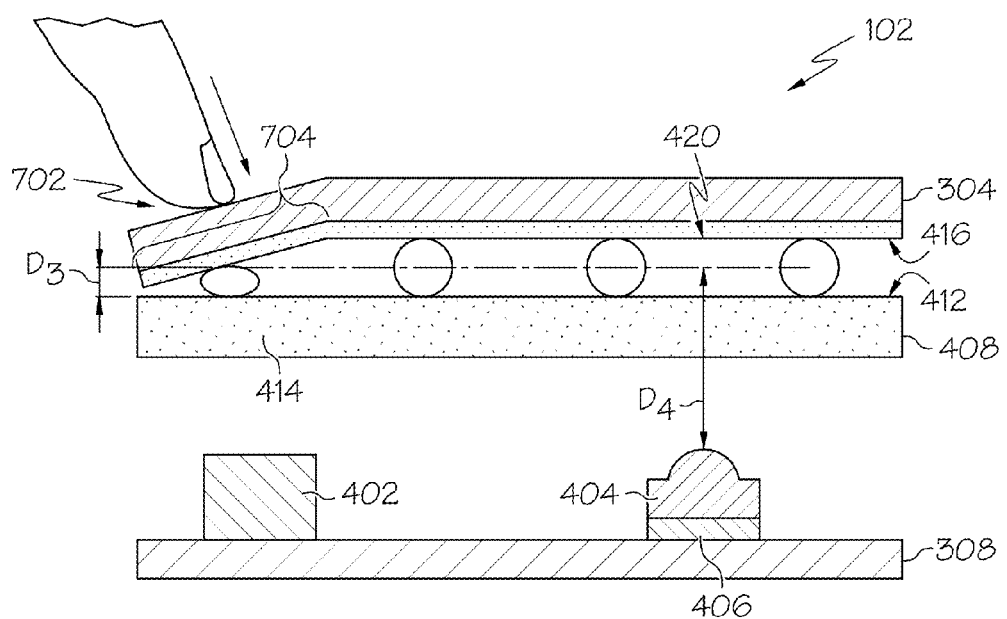
FIG. 7 is a cross-sectional view of the optical interference based user input device of FIG. 3 showing a user interacting with a touch surface of the device, in accordance with one example.

However, when a user places his/her finger or another object onto the touch surface 304 and applies a force, the touch surface 304 is deformed and/or displaced a given amount based on the amount of force being applied by the user, as shown in FIG. 7. Stated differently, the distance between at least a portion of bottom surface 416 of the touch surface 304 and at least a portion of the top surface 412 of the translucent layer 408 is at a second distance D3. For example, as can be seen in FIG. 7, at least the portion 702 of the touch surface 304 corresponding to the location of the user's finger or other object applying a force has been displaced/deformed. One or more of the resilient spacers 422 are also displaced/deformed as well. This displacement of the portion 702 of the touch surface 304 and the one or more spacers 422 defines a second distance, D3, between the bottom surface 416 of the touch surface 304 and the top surface 412 of the translucent layer 408 and at least a second vertical distance, D4, between the bottom surface 416 of the touch surface 304 and the IPDM 406 (including the optional receiver lens 404).

This displacement further results in at least a portion 704 of the second set of patterns 420 being displaced with respect to the first set of patterns 414, as shown in FIG. 7. This displacement of at least the portion 704 of the second set of patterns 420 creates a third set of patterns 804 (FIG. 8), such as an inference pattern, between the first and second patterns 414, 420. For example, FIG. 8 shows an image 802 captured by the IPDM 406 as the user is touching the portion 702 of the touch surface 304 discussed above with respect to FIG. 7.

Figure 8:
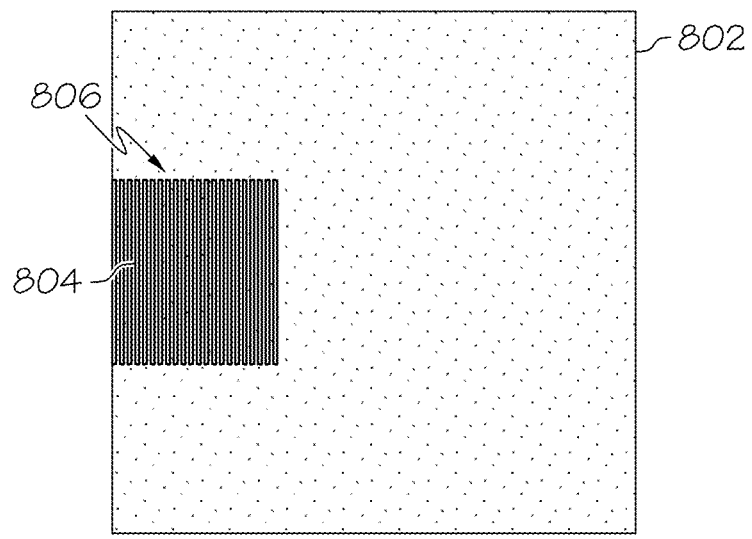
FIGS. 8-11 illustrate various images comprising an interference pattern(s) captured by the image sensor of the optical interference based user input device of FIG. 2 as a result of a user interacting with the touch surface of the device, in accordance with one example.
Figure 15:
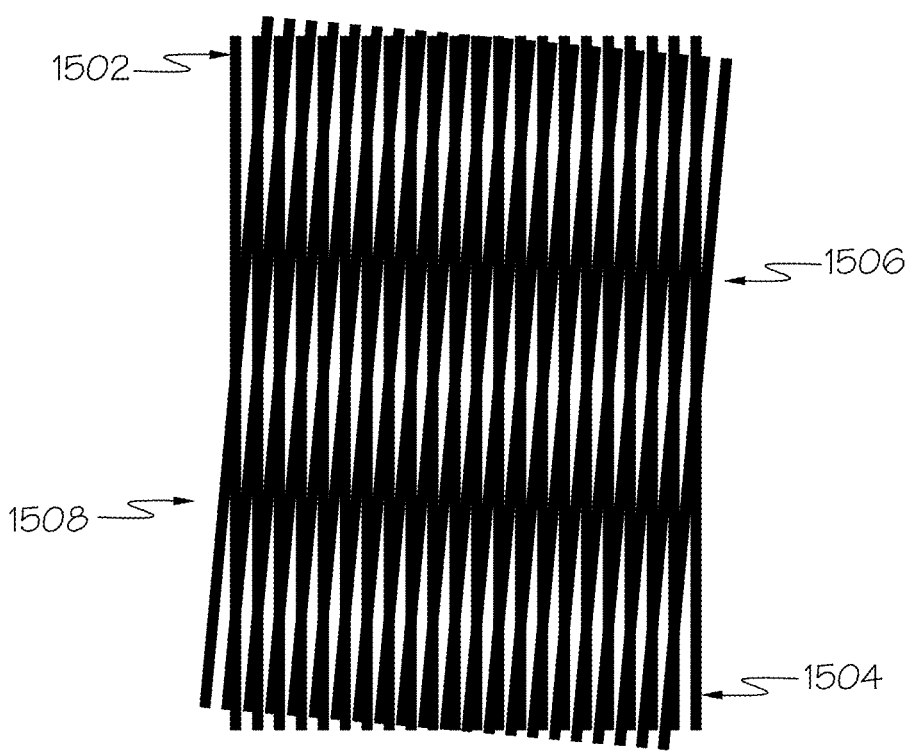
FIG. 15 illustrates an example of a second set of patterns being displaced with respect to a first set of patterns.

As can be seen, FIG. 8 shows that the image 802 comprises a first region 806 that has been changed, i.e., comprises an interference pattern 804 that is generated at a location in the image 802 that corresponds to the portion 702 of the touch surface 304 that the user is currently applying force/pressure to. It should be noted that the size and shape of the region 806 depicted in FIG. 8 is shown for illustrative purposes only. This interference pattern 804 is created as a result of the portion 704 of the second set of patterns 420 being displaced (e.g., becoming opposed, rotated by a given angle, etc.) with respect to the first set of patterns 414. For example, FIG. 15 shows a second set of patterns 1504 being displaced with respect to a first set of patterns 1502. As a result of this displacement, one or more interference patterns 1506, 1508 are created. It should be noted that the present invention is not limited to the interference pattern shown in FIG. 15. For example, FIGS. 16-19 show additional examples of interference patterns 1600, 1700, 1800, 1900 comprising various configurations such as, a striped, circular, square, or serpentine configuration. It is assumed that the reader is familiar with the principles of interference patterns, such as moiré patterns, and, therefore, a more detailed explanation thereof will not be given.

The image 802 comprising the interference pattern 804 captured by the IPDM 406 or at least information associated therewith is then transmitted to the controller/processor 1302, 1416. Because the image 802 captured by the IPDM 406 corresponds to the touch surface 304, the controller/processor 1302, 1416 is able to determine the location on the touch surface 304 where the user has placed his/her finger(s) or object(s) based on the location of the interference pattern 804 in the image 802. The controller/processor 1302, 1416 performs one or more actions, such as a selection and/or a movement of a cursor on the display.

Figure 9:
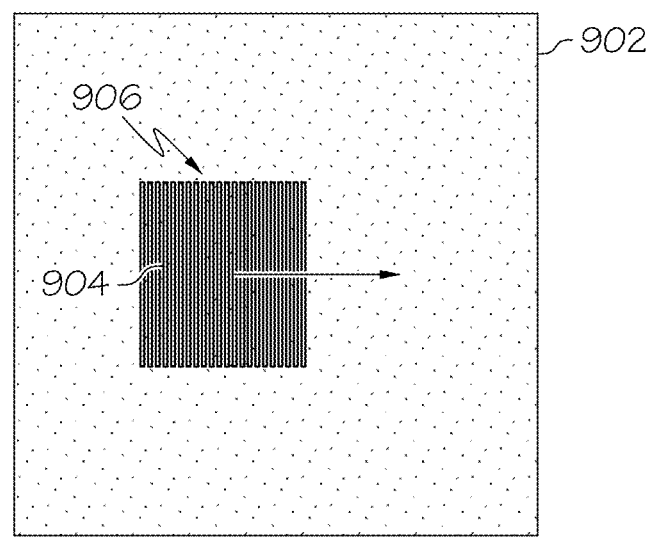

As the user moves his/her finger/object across the touch surface 304, other portions of the touch surface 304 become deformed/displaced similar to that shown and discussed above with respect to FIG. 7. This results in additional interference patterns being generated, the shape of an interference pattern(s) being changed, and/or the location of an interference pattern(s) being changed. These changes to interference patterns or the new interference patterns that have been generated are detected by the IPDM 406, as shown in FIG. 9. As can be seen in FIG. 9 the image 902 captured by the IPDM 406 shows that a second region 906 comprises a second interference pattern 904 as a result of the user moving his/her finger/object from the first location 702 on the touch surface 304 to a second location on the touch surface 304.

In this example, the second region 906 in the image 902 corresponds to the second location on the touch surface 304 where the user has transitioned his/her finger/object to. The image 902 comprising the second interference pattern 904 captured by the IPDM 406 or at least information associated therewith is then transmitted to the controller/processor 1302, 1416, similar to that discussed above. Then, based on the location of the second interference pattern 904 with respect to the first interference pattern 804, the time lapse between the first interference pattern 804 being generated and the second interference pattern 904 being generated, or the like, the controller/processor 1302, 1416 is able to determine the direction, speed, and/or pattern of the user's movement across the touch surface 304. The controller/processor 1302, 1416 can then perform one or more operations based thereon. For example, the controller/processor 1302, 1416 can move a cursor on the display, perform a scrolling operation, increase/decrease the cursor movement velocity, move an icon, etc.

In another example, the user is able to place two or more fingers or objects on the touch surface 304 at a first and second location, respectively. For example, the user can place his/her thumb and finger on the touch surface 304 and perform a "pinching" motion where the user brings his/her thumb and fingers together. When the user initially places his/her thumb and finger on the touch surface 304 a first portion of the touch surface 304 corresponding to the location of the user's thumb and a second portion of the touch surface 304 corresponding to the location of the user's finger become deformed/displaced, as discussed above with respect to FIG. 7

Therefore, at least a first and a second portion of the second set of patterns 420 corresponding to the first and second portions of the touch surface 304 being deformed/displaced are also deformed/displaced. This displacement of the first and second portions of the second set of interference patterns 420 causes these portions to become displaced with respect to a corresponding portion of the first set of patterns 414. This results in a third pattern, such as an interference pattern, to be detected by the IPDM 406 in a first region of the image and a second interference pattern in a second region of the image corresponding to the first and second location at which the user's thumb and finger have been placed.

Figure 10:
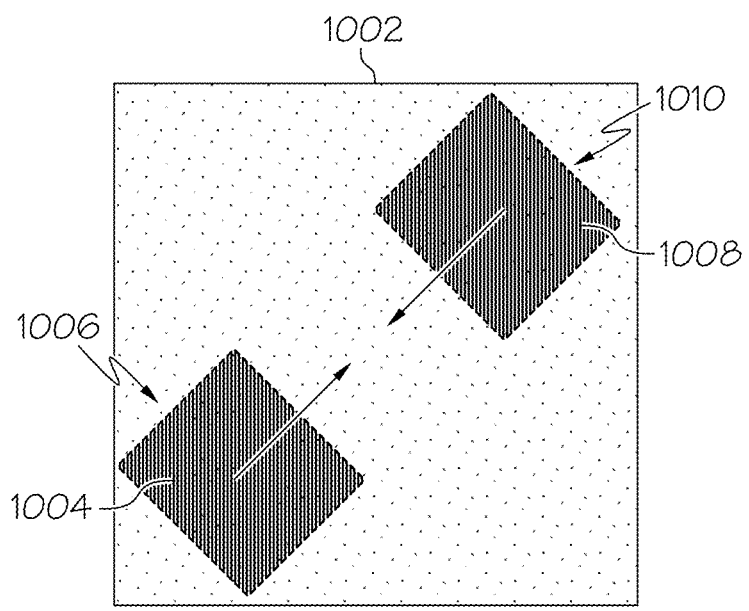

For example, FIG. 10 shows an image 1002 captured by the IPDM 406 that corresponds to the touch surface 304. As can be seen in FIG. 10, a first interference pattern 1004 is detected by the IPDM 406 in a first region 1006 of the image 1002 and a second interference pattern 1008 is detected in a second region 1010 of the image 1002 corresponding to the first and second location at which the user's thumb and finger have been placed on the touch surface 304, respectively. As the user moves his/her finger and thumb across the touch surface 304, other portions of the touch surface 304 become deformed/displaced similar to that shown and discussed above with respect to FIG. 7. This results in additional interference patterns being generated and detected by the IPDM 406 in subsequent images 1102, as shown in FIG. 11.

Figure 11:
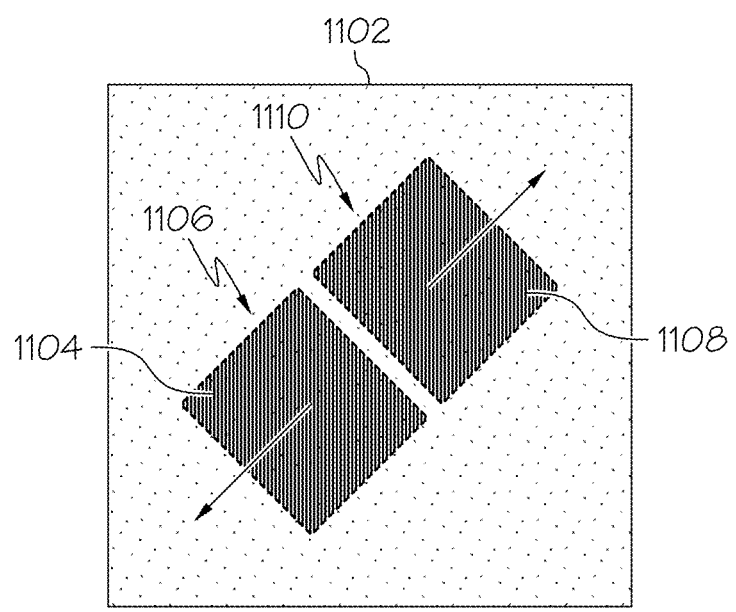

FIG. 11 shows additional interference patterns 1104, 1108 created in other regions 1106, 1110 of the image 1102 resulting from the user moving his/her finger and thumb from the first and second locations of the touch surface 304 discussed above with respect to FIG. 10 to a new location corresponding to regions 1106 and 1110 shown in FIG. 11. Based upon the IPDM 406 detecting the interference patterns 1004, 1008, 1104, 1108 shown in FIGS. 10 and 11 the controller/processor 1302, 1416 can then perform one or more operations based on the position of these interference patterns with respect to each other, the change in position between the first and second patterns and the third and fourth patterns, respectively, and the like.

Figure 20:
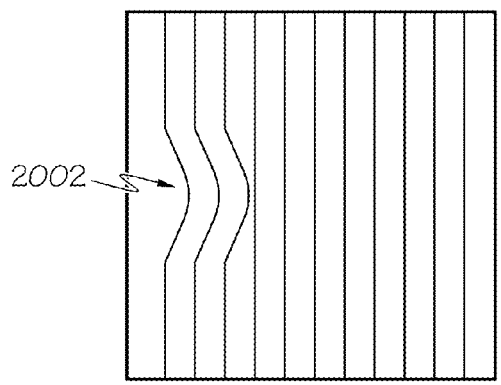
FIGS. 20-23 is a set of interference patterns being created as a result of the user placing his/her finger on the touch surface.
Figure 21:
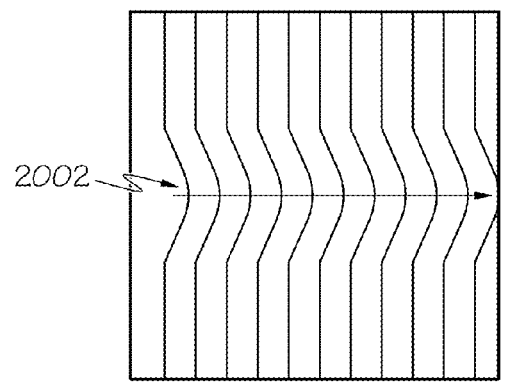
Figure 22:
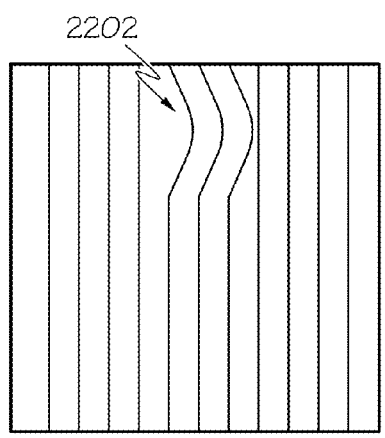
Figure 23:
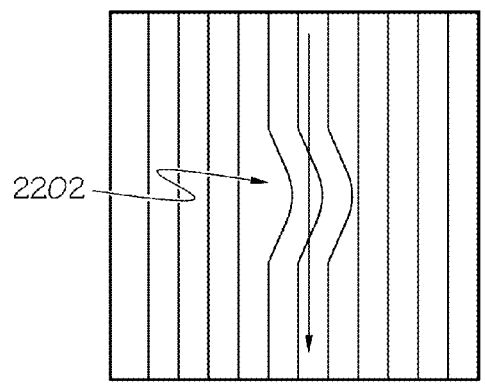

FIGS. 20-23 show other examples of interference patterns being created/changed as a user interacts with the touch surface 304 of the input device 102. For example, FIG. 20 shows a set of interference patterns 2002 being created as a result of the user placing his/her finger on the touch surface 304. As the user drags his/her finger in a horizontal direction across the touch surface 304, the second set of patterns 420 are displaced with respect to the first set of patterns 414 resulting in the set of interference patterns 2002 also changing and/or moving, as shown in FIG. 21. As can be seen in FIG. 21, the changes/movement of the set of interference patterns 2002 correspond to the changes in location and movement of the user's finger across the touch surface 304. FIG. 22 shows another set of interference patterns 2202 being created as a result of the user placing his/her finger on the touch surface 304 and drags his/her finger in a vertical direction. As the user interacts with the touch surface 304 the set of interference patterns 2002 change and/or move, as shown in FIG. 23. The changes/movement of the set of interference patterns 2202 correspond to the changes in location and movement of the user's finger across the touch surface 304. The IPDM 406 detects the set of interference patterns 2002, 2202 and changes thereto and the controller/processor 1302, 1416 can then performs one or more operations based thereon.

As can be seen, the input device 102 of one or more examples of the present invention overcomes the problems of conventional optical based user input devices by utilizing one or more sets of patterns 414, 420 to generate optical interference patterns corresponding to a user's interaction with the touch surface 304 of the input device 102. Therefore, because the input device 102 comprises a sensor module 401 that utilizes interference patterns instead of detecting light reflections, the input device 102 is not adversely affected by ambient light and residue. Also, the touch surface 304 and/or sensor cover 302 of the input device 102 can be made of a variety of materials and colors are is no longer limited to being transparent.

Flow Diagram

Figure 12:
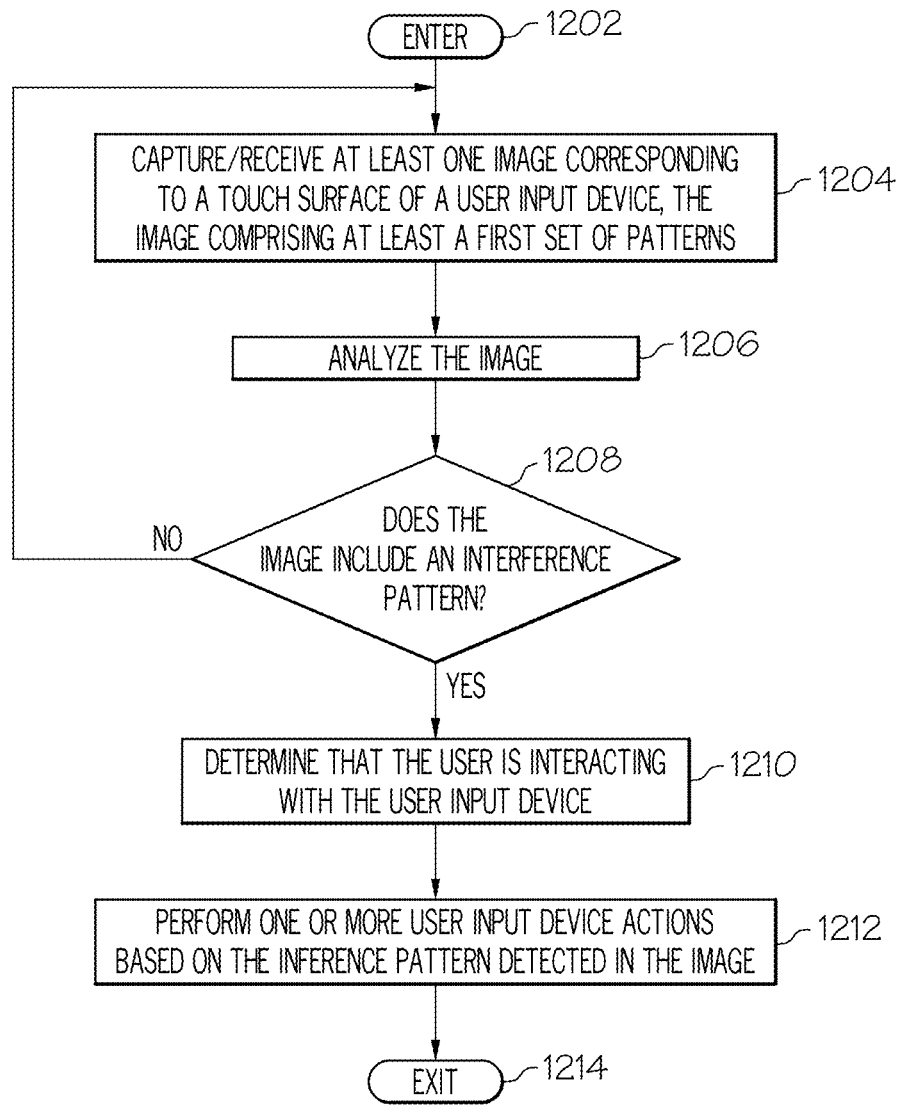
FIG. 12 illustrates an optical interference based user input device management process, in accordance with one example.

FIG. 12 is a flow diagram for an optical interference based user input device management process 1200. The optical interference based user input device management process 1200 manages the user input device and its operations based on the utilization and detection of optical interference patterns, as discussed above with respect to FIGS. 1-11. This optical interference based user input device management process 1200 is performed by the controller 1302 or processor 1416 discussed below.

The operational flow diagram of FIG. 12 begins at step 1202 and continues directly to step 1204. The IPDM 406, at step 1204, captures/receives a least one image 602 corresponding to a touch surface 304 of a input device 102. The image 602 comprises at least a first set of patterns 414. The controller 1302 or processor 1416, at step 1206, analyzes the image 602. The controller 1302 or processor 1416, at step 1208, determines if the image comprises at least one interference pattern 804. If the result of this determination is negative, the control flow returns to step 1204. If the result of this determination is positive, the controller 1302 or processor 1416, at step 1210, determines that the user is interacting with the input device 102. The controller 1302 or processor 1416, at step 1212, then performs one or more user input device operations based on the interference pattern(s) that has been detected in the image(s) 602. The control flow then exits at step 1214.

Controller

Figure 13:
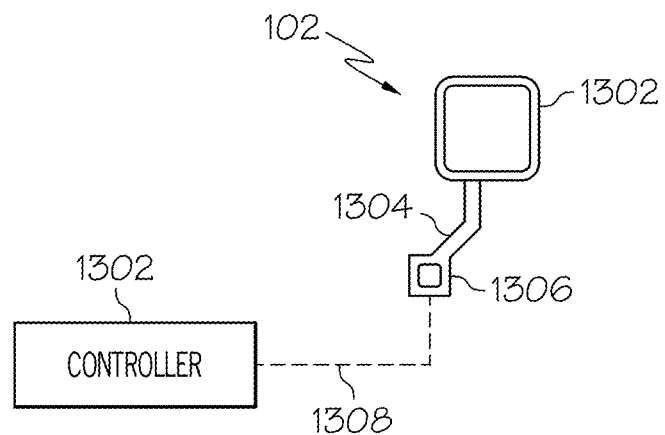
FIG. 13 illustrates electrical connections between sensors optical interference based user input device of FIG. 3 and a controller/processor, in accordance with one example.

FIG. 13 shows one example of a controller 1302. With further reference to FIG. 13, the input device 102 may, in one example, be provided with flexible connector wires 1304 which carry signals between the user input device and other circuits within the electronic device 100. The input device 102 may be provided with internal electronics or circuits, not shown, which combine or prepare such signals before and or after transmission on connector wires 1304. A connector, for example board to board connector 1306, may be provided to electrically connect connector wires 1304 to a circuit board (not shown) within the electronic device 100. Other wires 1308 convey the signals to the controller 1302, which may prepare and process the signals for further processing elsewhere within the electronic device 100, or wires 1308 may connect directly to a microprocessor 1416 (FIG. 14) of the electronic device 100.

Electronic Device

Figure 14:
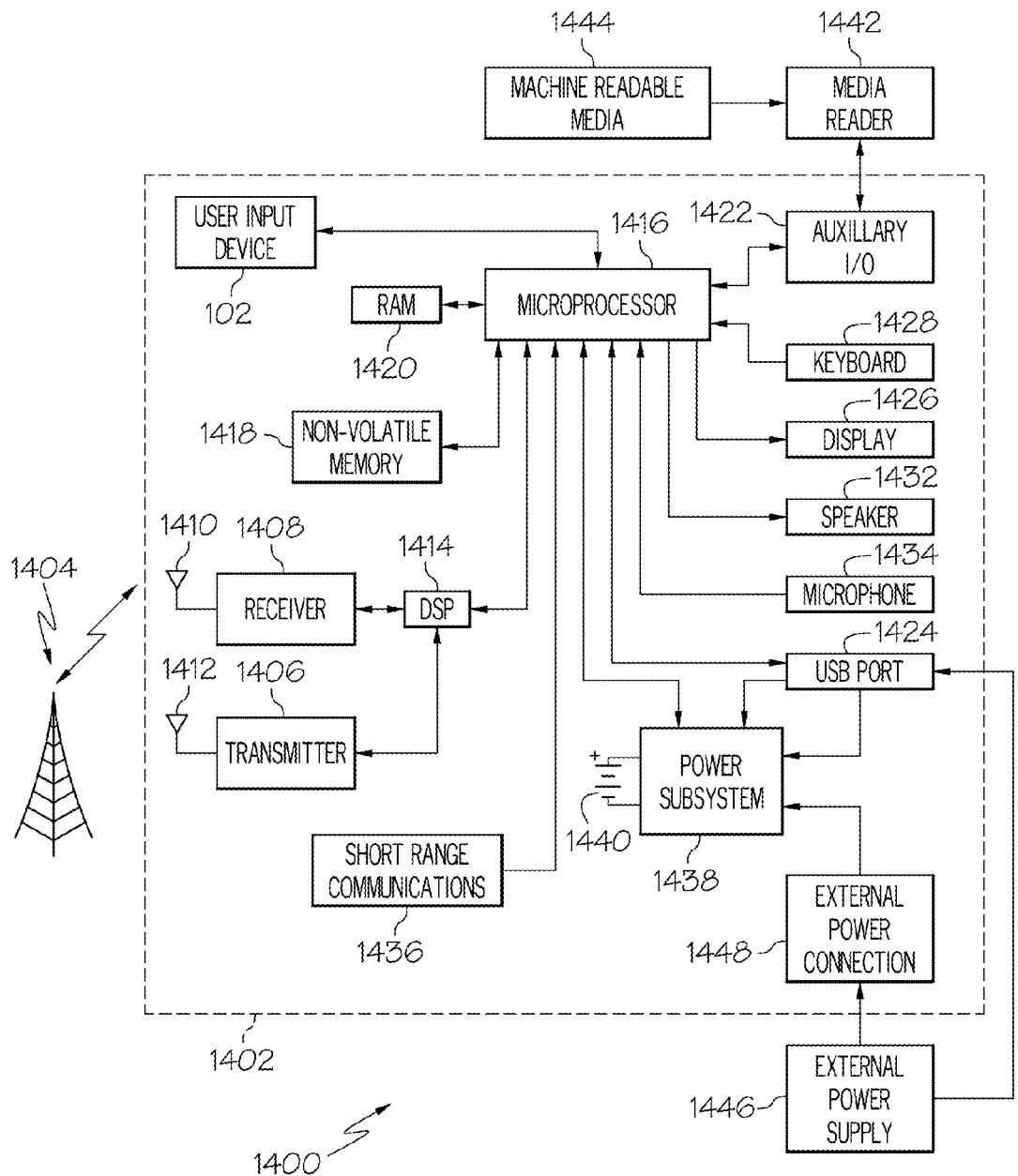
FIG. 14 is a block diagram of an electronic device and associated components in which the systems and methods disclosed herein may be implemented.
Figure 16:
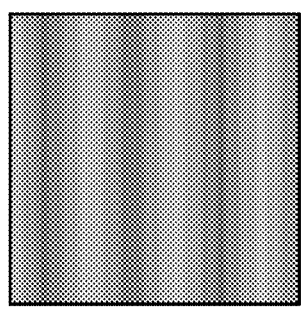
FIGS. 16-19 illustrate examples of interference patterns with in various configurations.
Figure 17:
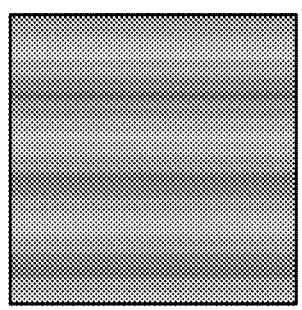
Figure 18:
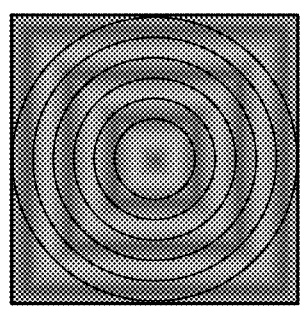
Figure 19:
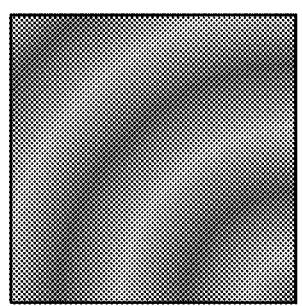

FIG. 14 is a block diagram of an electronic device and associated components 1400 in which the systems and methods disclosed herein may be implemented. In this example, an electronic device 1402 is a wireless two-way communication device with voice and data communication capabilities. Such electronic devices communicate with a wireless voice or data network 1404 using a suitable wireless communications protocol. Wireless voice communications are performed using either an analog or digital wireless communication channel. Data communications allow the electronic device 1402 to communicate with other computer systems via the Internet. Examples of electronic devices that are able to incorporate the above described systems and methods include, for example, a data messaging device, a two-way pager, a cellular telephone with data messaging capabilities, a wireless Internet appliance, a tablet computing device or a data communication device that may or may not include telephony capabilities.

The illustrated electronic device 1402 is an example electronic device that includes two-way wireless communications functions. Such electronic devices incorporate communication subsystem elements such as a wireless transmitter 1406, a wireless receiver 1408, and associated components such as one or more antenna elements 1410 and 1412. A digital signal processor (DSP) 1414 performs processing to extract data from received wireless signals and to generate signals to be transmitted. The particular design of the communication subsystem is dependent upon the communication network and associated wireless communications protocols with which the device is intended to operate.

The electronic device 1402 includes a microprocessor 1416 (and/or the controller 1302 discussed above) that controls the overall operation of the electronic device 1402. The microprocessor 1416 interacts with the above described communications subsystem elements and also interacts with other device subsystems such as non-volatile memory 1418 and random access memory (RAM) 1420. The non-volatile memory 1418 and RAM 1420 in one example contain program memory and data memory, respectively. The microprocessor 1416 also interacts with the input device 102, an auxiliary input/output (I/O) device 1422, a Universal Serial Bus (USB) Port 1424, a display 1426, a keyboard 1428, a speaker 1432, a microphone 1434, a short-range communications subsystem 1436, a power subsystem 1438, and any other device subsystems.

A battery 1440 is connected to a power subsystem 1438 to provide power to the circuits of the electronic device 1402. The power subsystem 1438 includes power distribution circuitry for providing power to the electronic device 1402 and also contains battery charging circuitry to manage recharging the battery 1440. The power subsystem 1438 includes a battery monitoring circuit that is operable to provide a status of one or more battery status indicators, such as remaining capacity, temperature, voltage, electrical current consumption, and the like, to various components of the electronic device 1402. An external power supply 1446 is able to be connected to an external power connection 1448.

The USB port 1424 further provides data communication between the electronic device 1402 and one or more external devices. Data communication through USB port 1424 enables a user to set preferences through the external device or through a software application and extends the capabilities of the device by enabling information or software exchange through direct connections between the electronic device 1402 and external data sources rather than via a wireless data communication network.

Operating system software used by the microprocessor 1416 is stored in non-volatile memory 1418. Further examples are able to use a battery backed-up RAM or other non-volatile storage data elements to store operating systems, other executable programs, or both. The operating system software, device application software, or parts thereof, are able to be temporarily loaded into volatile data storage such as RAM 1420. Data received via wireless communication signals or through wired communications are also able to be stored to RAM 1420. As an example, a computer executable program configured to perform the optical interference based user input device management process 1200, described above, is included in a software module stored in non-volatile memory 1418.

The microprocessor 1416, in addition to its operating system functions, is able to execute software applications on the electronic device 1402. A predetermined set of applications that control basic device operations, including at least data and voice communication applications, is able to be installed on the electronic device 1402 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the electronic device 1402 through, for example, the wireless network 1404, an auxiliary I/O device 1422, USB port 1424, short-range communications subsystem 1436, or any combination of these interfaces. Such applications are then able to be installed by a user in the RAM 1420 or a non-volatile store for execution by the microprocessor 1416.

In a data communication mode, a received signal such as a text message or web page download is processed by the communication subsystem, including wireless receiver 1408 and wireless transmitter 1406, and communicated data is provided the microprocessor 1416, which is able to further process the received data for output to the display 1426, or alternatively, to an auxiliary I/O device 1422 or the USB port 1424. A user of the electronic device 1402 may also compose data items, such as e-mail messages, using the keyboard 1428, which is able to include a complete alphanumeric keyboard, a telephone-type keypad or a "virtual" keyboard implemented as key images rendered upon a touchscreen display, in conjunction with the display 1426 and possibly an auxiliary I/O device 1422. Such composed items are then able to be transmitted over a communication network through the communication subsystem.

For voice communications, overall operation of the electronic device 1402 is substantially similar, except that received signals are generally provided to a speaker 1432 and signals for transmission are generally produced by a microphone 1434. Alternative voice or audio I/O subsystems, such as a voice message recording subsystem, may also be implemented on the electronic device 1402. Although voice or audio signal output is generally accomplished primarily through the speaker 1432, the display 1426 may also be used to provide an indication of the identity of a calling party, the duration of a voice call, or other voice call related information, for example.

Depending on conditions or statuses of the electronic device 1402, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1436 is a further optional component which may provide for communication between the electronic device 1402 and different systems or devices, which need not necessarily be similar devices. For example, the short-range communications subsystem 1436 may include an infrared device and associated circuits and components or a Radio Frequency based communication module such as one supporting Bluetooth® communications, to provide for communication with similarly-enabled systems and devices.

A media reader 1442 is able to be connected to an auxiliary I/O device 1422 to allow, for example, loading computer readable program code of a computer program product into the electronic device 1402 for storage into non-volatile memory 1418. In one example, computer readable program code includes instructions for performing the pressure detecting user input device operating process 1200, described above. One example of a media reader 1442 is an optical drive such as a CD/DVD drive, which may be used to store data to and read data from a computer readable medium or storage product such as computer readable storage media 1444. Examples of suitable computer readable storage media include optical storage media such as a CD or DVD, magnetic media, or any other suitable data storage device. Media reader 1442 is alternatively able to be connected to the electronic device through the USB port 1424 or computer readable program code is alternatively able to be provided to the electronic device 1402 through the wireless network 1404.

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A user input device for an electronic device, comprising:
an illumination source;
an image sensor module;
a translucent layer disposed above the illumination source and the image sensor module, the translucent layer comprising at least a first set of patterns disposed thereon; and
a deformable layer disposed above the translucent layer;
at least a second set of patterns present on a bottom surface of the deformable layer, the bottom surface facing the translucent layer; and
a separation region separating the translucent layer and the deformable layer, the separation region separating the translucent layer and the deformable layer by a separation distance, the separation distance having first distance when no pressure is applied to the deformable layer,
the illumination source configured to illuminate at least the portion of the translucent layer, and
the image sensor module comprising a field of view corresponding to at least a portion of the translucent layer, the image sensor module being configured to detect a third set of patterns when the deformable layer is deformed, the third set of patterns comprising at least one interference pattern as viewed by the image sensor module, the interference pattern comprising a combination of the first set of patterns and portions of the second set of patterns that are exposed to the image sensor module around patterns in the first set of patterns due to a reduction in the separation distance due to deformation of the deformable layer.

2. The user input device of claim 1, further comprising:
a touch surface disposed above the deformable layer.

3. The user input device of claim 1, the second set of patterns comprising a projection of the first set of patterns onto the bottom surface of the deformable layer.

4. The user input device of claim 1, the second set of patterns being separate and distinct from the first set of patterns.

5. The user input device of claim 1, further comprising:
a set of resilient spacers disposed within the separation region between and abutting the bottom surface of the deformable layer and a top surface of the translucent layer.

6. The user input device of claim 1, the deformable layer configured to deform in response to a force being applied to the deformable layer.

7. The user input device of claim 1, where the third set of patterns is detected by the image sensor in response to at least a portion of the deformable layer being moved with respect to the translucent layer.

8. The user input device of claim 1, where image sensor module detects the third set of patterns within at least one image captured by the image sensor.

9. The user input device of claim 8, the image comprising the third set of patterns in a region of the image corresponding to a region of a touch surface disposed above the deformable layer where a force is currently being applied.

10. An electronic device, comprising:
a processor;
a memory, communicatively coupled to the processor, configured to store information operated upon by the processor; and
a user input device, comprising:
an illumination source;
an image sensor module;
a translucent layer disposed above the illumination source and the image sensor module, the translucent layer comprising at least a first set of patterns disposed thereon; and
a deformable layer disposed above the translucent layer;
at least a second set of patterns present on a bottom surface of the deformable layer, the bottom surface facing the translucent layer; and
a separation region separating the translucent layer and the deformable layer, the separation region separating the translucent layer and the deformable layer by a separation distance, the separation distance having first distance when no pressure is applied to the deformable layer, and
the image sensor module comprising a field of view corresponding to at least a portion of the translucent layer, the image sensor module being configured to detect a third set of patterns when the deformable layer is deformed, the third set of patterns comprising at least one interference pattern as viewed by the image sensor module, the interference pattern comprising a combination of the first set of patterns and portions of the second set of patterns that are exposed to the image sensor module around patterns in the first set of patterns due to a reduction in the separation distance due to deformation of the deformable layer.

11. The electronic device of claim 10, the user input device further comprising:
 a touch surface disposed above the deformable layer.

12. The electronic device of claim 10, the second set of patterns comprising a projection of the first set of patterns onto the bottom surface of the deformable layer.

13. The electronic device of claim 10, the second set of patterns being separate and distinct from the first set of patterns.

14. The electronic device of claim 10, the user input device further comprising:
 a set of resilient spacers disposed comprises a projection of the first set of patterns onto the bottom surface of the deformable layer.

15. The electronic device of claim 10, the deformable layer configured to deform in response to a force being applied to the deformable layer.

16. The electronic device of claim 10, where the third set of patterns is detected by the image sensor in response to at least a portion of the deformable layer being moved with respect to the translucent layer.

17. The electronic device of claim 10, where the image sensor module detects the third set of patterns within at least one image captured by the image sensor.

18. The electronic device of claim 17, the image comprising the third set of patterns in a region of the image corresponding to a region of a touch surface disposed above the deformable layer where a force is currently being applied.

* * * * *